(12) United States Patent
Desai et al.

(10) Patent No.: US 8,281,187 B1
(45) Date of Patent: Oct. 2, 2012

(54) UNIFIED AND EXTENSIBLE META-TESTING FRAMEWORK

(75) Inventors: Nirav P Desai, Issaquah, WA (US); Michael C. Moore, Issaquah, WA (US); Kyle Andrew Farrell, Seattle, WA (US); Stanislav Fritz, Mercer Island, WA (US)

(73) Assignee: Amazon Technologies, Reno, NV (US)

( * ) Notice: Subject to any disclaimer, the term of this patent is extended or adjusted under 35 U.S.C. 154(b) by 19 days.

(21) Appl. No.: 12/890,882

(22) Filed: Sep. 27, 2010

(51) Int. Cl.
*G06F 11/00* (2006.01)

(52) U.S. Cl. .................... 714/38.1; 714/25; 714/38.14

(58) Field of Classification Search ............ 714/25, 714/27, 38.1, 38.14, 40, 45, 46
See application file for complete search history.

(56) References Cited

U.S. PATENT DOCUMENTS

| | | | |
|---|---|---|---|
| 7,543,275 B2* | 6/2009 | Kuturianu et al. | 714/38.14 |
| 7,657,789 B1* | 2/2010 | Gerber et al. | 714/25 |
| 2003/0014510 A1* | 1/2003 | Avvari et al. | 709/223 |
| 2009/0307530 A1* | 12/2009 | Tarta | 714/38 |

* cited by examiner

*Primary Examiner* — Scott Baderman
*Assistant Examiner* — Joseph D Manoskey
(74) *Attorney, Agent, or Firm* — Lee & Hayes, PLLC (57) ABSTRACT

An architecture and techniques for implementing a unified and extensible meta-testing framework within a distributed environment. This framework allows entities within the distributed environment to run tests written in different testing frameworks in a unified way. In addition, this disclosure describes techniques for allowing an entity within the distributed environment to test itself, both from its own perspective as well as from the perspective of other entities within the distributed environment.

18 Claims, 6 Drawing Sheets

UNIFIED AND EXTENSIBLE META-TESTING FRAMEWORK

BACKGROUND

In a distributed-services environment, different operators may operate and control each of the multiple different services within the environment to perform a particular task. These services, however, may rely upon one another to achieve these tasks. For instance, a first service may make calls to a second service and to a third service (and potentially many more) within the environment when executing the task of the first service. As such, the first service is dependent upon the second and third services while still generally operating and controlling the task of the first service independently. In addition, the second and third services depend upon the first service when the second and third services perform their own respective tasks.

In the above example, the first service may make calls into the second and third services when the first service is in operation or is being tested. However, because each of these services operates and controls their own service independently, these services may write and run testing frameworks in entirely different formats. Because of this, it is difficult to test and, hence, understand how changes made to a particular service of the distributed-services environment may (or may not) affect other services operating within the environment, as well as the stability of the environment as a whole.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes an architecture and techniques for implementing a unified and extensible meta-testing framework within a distributed environment. This framework described below allows entities within the distributed environment to run tests written in different testing frameworks in a unified way. In addition, this disclosure describes techniques for allowing an entity within the distributed environment to test itself, both from its own perspective as well as from the perspective of other entities within the distributed environment.

Distributed environments often consist of multiple different entities that each operate to perform a discrete task, while at the same time depending upon the help of one or more other entities of the environment. For instance, a distributed-services environment may consist of multiple different services that each performs a discrete task, with these discrete tasks often collectively performing a larger task. For instance, a business or other organization (or a collection of businesses or organizations) may include multiple different services to form the distributed-services environment.

Within the environment, each of the services may implement a different type and/or format of testing frameworks for testing software of the service. In many cases, allowing each service to define these custom testing frameworks is efficient and effective, as the services are often in the best position to know how to best test themselves. However, because these services often depend upon other services within the environment, when one service makes a change, this change may affect other dependent service. Therefore, the meta-testing framework described below allows for services to run multiple different testing frameworks, regardless of the type or format of the frameworks, to allow the service to learn how its changes will affect itself, as well as other services that depend from this service.

To provide this ability, the unified and extensible meta-testing framework provides a plug-in mechanism that allows services or other entities in a distributed environment to plug-in their different testing frameworks to the meta-testing framework. Once a service plugs in its testing framework, the tests written in the framework can be run in a unified way with tests written in a different format. For instance, if two different services plug in two different types of testing frameworks that relate to a common project of the distributed environment, the meta-testing framework may run both of the individual testing frameworks when testing the project despite this format difference. This plug-in mechanism may allow services to plug in tests of any format, such as JUnit, TestNG, and the like.

In addition, the unified and extensible meta-testing framework described below may allow services to specify whether to execute a test in a single thread or in multiple threads that run in parallel with one another. Executing tests in multiple threads may shorten an amount of time needed to execute the different types of testing frameworks.

The meta-testing framework may also provide the ability to search and run tests written in different formats using tags. That is, operators or other users of the distributed services may associate different tags (e.g., textual or otherwise) with different tests. By doing so, other operators or users running tests may request to execute subsets of tests that are associated with a particular set of one or more tags. In some instances, the meta-testing framework may provide a drop-down menu or the like, allowing the users to select tags. Conversely, the framework may allow the user to enter a free-form natural language expression to locate and execute tests associated with a particular set of tags. For instance, a user may request that the meta-testing framework "run all project X tests and narrow down the set tests to Priority 1 tests." In response, the meta-testing framework may analyze the tags associated with each plugged in test and may execute those tests satisfying the natural language expression, while refraining to execute those tests that do not. In addition, the meta-testing framework may allow users to select tests to run by filtering a set of tests based on any other metadata.

The meta-testing framework described herein may also include an extensible reporting infrastructure that allows users to specify which types of reports the users would like to receive. For instance, a user may request to receive certain reports for certain tests during execution of the tests by the meta-testing framework, while requesting to receive reports for other tests after execution of the tests. Users may request to receive reports via email, short messaging service (SMS) text messages, multimedia messaging service (MMS) text messages, or in any other manner. Further, the user may request that the meta-testing framework take additional actions in response to detecting a predefined occurrence. For instance, envision that a service makes a change to piece of software of the service, and that the service would like to test this piece of software to determine whether or not the alteration affects operability of the service. The service may accordingly instruct the meta-testing to inform the service immediately if the test fails to allow the service to automatically revert back to a previous state of the service prior to the alteration.

In addition to allowing users to specify custom reports, the meta-testing framework may allow users to specify a custom retry strategy for failed tests. For instance, the framework may allow the users to instruct the framework to rerun a certain set of test cases that fail a certain number of times and a different set of test cases a different number of times. In addition, the users may instruct the framework to refrain from rerunning yet another set of test cases at all, even in the event that these test cases fail.

Finally, the unified and extensible testing framework may include additional toolsets that allow users to further customize the running of multiple different testing frameworks within a distributed environment. For instance, these toolsets may allow users to request that the framework auto-run certain tests when a service deploys a new version of software. Additionally, theses toolsets may allow a user to compare two different runs of tests and/or to receive a comprehensive view of multiple executions of test cases. While a few example toolsets are provided here and below, multiple other tools sets are similarly envisioned.

Several example distributed environments and architectures that may implement a unified and extensible meta-testing framework are described below. However, these example environments are but a few of many environments that may implement these techniques. For instance, while some of the example distributed environments consist of distributed services that communicate over a network, other distributed environments consisting of any other type of entity that may employ these techniques. For instance, the distributed environment may comprise a server farm or a data center that includes respective servers or respective sets of servers that each executes tests with use of a central testing platform. In another example, the entities of the distributed service may comprise respective software modules or respective sets of software modules that operate on a common operating system within a single housing of a computing device.

Example Distributed Environment and Meta-Testing Framework

Figure 1:
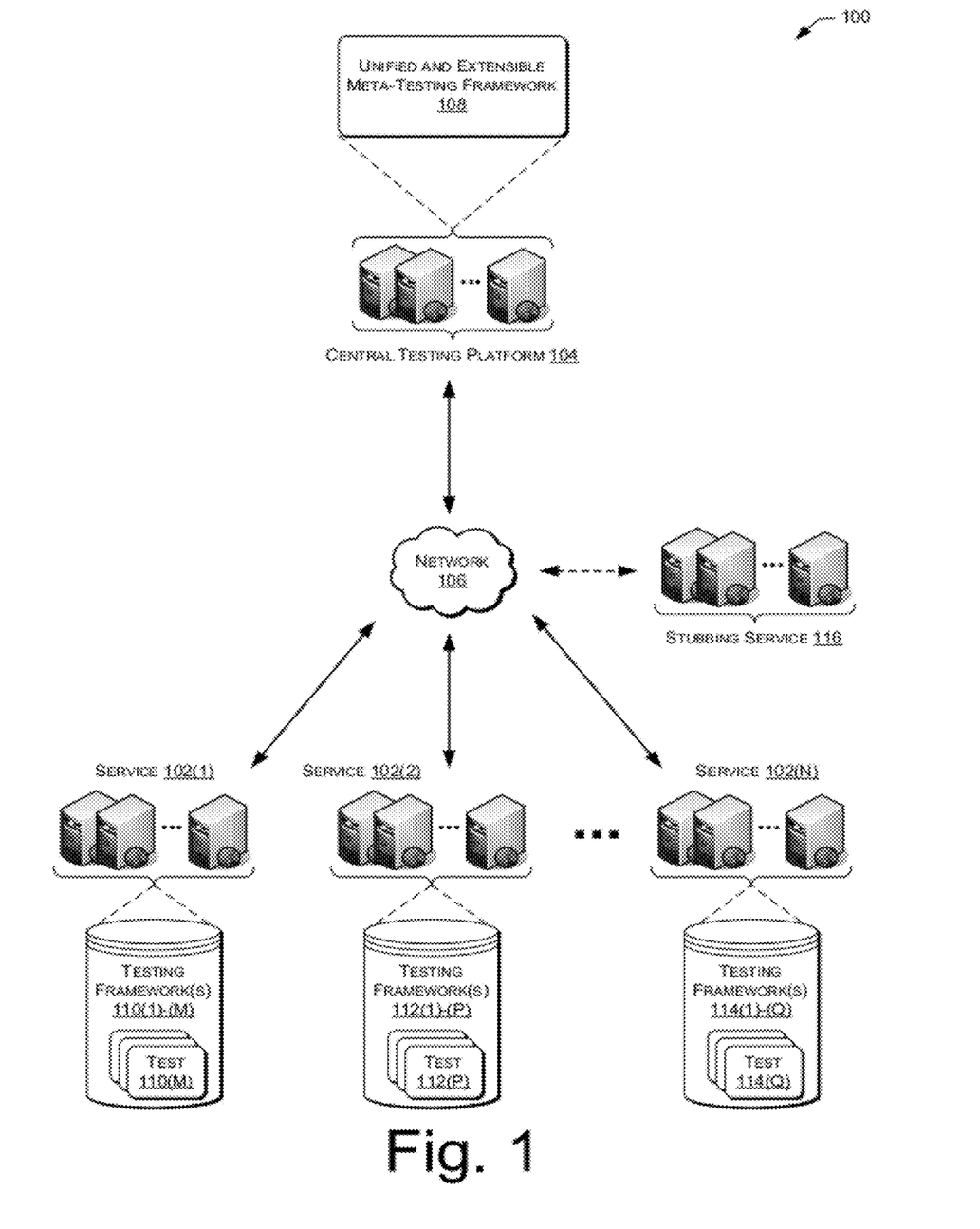
FIG. 1 illustrates a distributed-services environment that includes multiple different services, as well as a central testing platform that implements a unified and extensible meta-testing framework. This framework allows for unified testing of services within the environment, without regard to whether or not these services implement different testing formats.

FIG. 1 illustrates an example distributed-services environment 100 that may implement the described techniques. The environment 100 may include a plurality of different services 102(1), 102(2), . . . , 102(N) that communicate with one another and with a central testing platform 104 over a network 106. These services may depend upon one another, while being separately controlled. Even when separately controlled, these services may or may not each be associated with a common entity or owner. The network 106 is representative of any one or combination of multiple different types of networks, such as the Internet, cable networks, cellular networks, wireless networks, and wired networks. The network 106 may be a public or a private network. Furthermore, while FIG. 1 illustrates several arrows, each of the illustrated services may communicate directly or indirectly with one another via the network 106.

Each of the services 102(1)-(N) may operate to perform a particular task for a common or different entities. For instance, each service may perform one or more discrete tasks for a common company, such as an e-commerce retailer, an educational institution, a governmental agency, or any other entity that operates different services to perform different tasks.

In the example of the e-commerce retailer, for instance, a first service may implement and maintain a catalog of items offered for acquisition, a second service may implement customer ordering, a third service may implement customer payments, a fourth service may implement and maintain user accounts, and so on. In this and other examples, the discrete services are operated and controlled separately, but rely upon one another for various inputs. For instance, a customer ordering service may place and control orders on behalf of customers. To do so, however, the customer ordering service may send requests to and receive replies from the catalog service, the payments service, the user account service, and the like. For instance, the catalog service may provide information about the item that a customer wishes to purchase, the payments service may maintain information regarding payment instruments associated with the customer, the user account service may maintain shipping preferences for the customer, and the like.

As illustrated, each of the services 102(1)-(N) and the central testing platform 104 is embodied as one or more servers that collectively have processing and storage capabilities to receive and send requests. These servers may be embodied in any number of ways, including as a single server, a cluster of servers, a server farm or data center, and so forth, although other server architectures (e.g., mainframe) may also be used. Alternatively, some or all of the services 102(1)-(N) and the central testing platform 104 may be embodied as a client device, such as desktop computer, a laptop computer, and so forth.

The central testing platform 104 includes a unified and extensible meta-testing framework 108. The unified and extensible meta-testing framework 108 may provide an interface to the multiple different services 102(1)-(N) to permit each respective service to plug one or more testing frameworks of the respective service into the unified and extensible meta-testing framework 108. In some instances, at least some of the testing frameworks of the services 102(1)-(N) are written in different formats. For instance, FIG. 1 illustrates that the service 102(1) employs testing frameworks 110(1), . . . , 110(M), while the service 102(2) employs testing frameworks 112(1), . . . , 112(P), and the service 102(N) employs testing frameworks 114(1), . . . , 114(Q). These services 102(1)-(N) may plug in some or all of each of these different testing frameworks, which may be of differing formats. For instance, the service 102(1) may have written some or all of the testing frameworks 110(1)-(M) in JUnit, while the service 102(2) may have written some or all of the testing frameworks 112(1)-(P) in TestNG, while the service 102(3) may have written some or all of the testing frameworks 114(1)-(Q) in yet another format, and so on.

In addition, the unified and extensible meta-testing framework 108 may receive requests from the services 102(1)-(N) to execute different ones of the multiple testing frameworks written in the different formats. In response, the unified and extensible meta-testing framework 108 may execute these testing frameworks associated the multiple services in the different formats in a unified way.

For instance, operators of the service 102(1) may desire to alter a portion of the service 102(1), but may first desire to ensure that both the service 102(1) and the distributed-services environment 100 as a whole will operate correctly after the alteration. As such, the service 102(1) may first run its own service-level tests (or simply "service tests") from the testing frameworks 110(1)-(M) to ensure that the service 102(1) itself still functions properly after the alteration. If so, the service 102(1) may choose to execute its own integration-level tests (or simply "integration tests) of the testing frameworks 110(1)-(P) to see if the service 102(1) will still function properly within the distributed-services environment 100 from the perspective the service 102(1). That is, the integration tests of the service 102(1) may determine how well the altered service 102(1) operates with those services that depend from the service 102(1).

If the service 102(1) passes these integration tests, the service 102(1) may request that the framework 108 now execute integration tests for those services that depend upon the service 102(1). By doing so, the service 102(1) may learn whether the alterations made by and to the service 102(1) will adversely affect (i.e., "break") clients of the service 102(1). To do so, the service 102(1) and/or the central testing platform 104 may identify those services that utilize data from the service 102(1) when in operation. In some instances, the service 102(1) may define a level of dependency in order to determine which services of the distributed services to test. For instance, the service 102(1) may define that only those services that directly depend from the service 102(1) are to be considered dependent for the purpose of a particular test run. Or, the service 102(1) may define dependent services as those services that directly depend upon the service 102(1), as well as those services that depend from those directly-dependent services. Of course, the service 102(1) (and other services utilizing the central testing platform 104) may define what it means to be a dependent service in any other way, which may vary on a per-test-run basis.

For instance, in the e-commerce retailer example, the service 102(1) may control "payments" for the retailer, while the service 102(2) may control "ordering." As such, when a customer of the e-commerce retailer requests to purchase an offered item with a particular payment instrument from the "ordering" service 102(2), the ordering service 102(2) may access data from the "payments" service 102(1) that identifies whether or not the particular payment instrument is a valid payment instrument for the transaction. As such, the service 102(2) (and/or other services within the environment 100) may depend upon the service 102(1), and the service 102(1) may wish to ensure that its own changes do not adversely affect the dependent service 102(2).

In response to receiving the request from the service 102(1), the framework 108 of the central testing platform 104 may execute certain tests (e.g., the integration tests) of the testing frameworks 112(1)-(P) against the service 102(1). The framework 108 may do so without regard for the format in which the service 102(2) has written these tests. That is, the framework 108 may execute these tests even if the format is entirely different from the format of the testing frameworks 110(1)-(M) of the service 102(1). The framework 108 may similarly run these integration tests for other services that depend upon the service 102(1).

By executing testing frameworks of the altered service 102(1) as well as frameworks of the services that depend upon the altered service 102(1), the service 102(1) may determine whether the alterations affect the service 102(1) itself, as well as whether the alterations affect the dependent services. With this information, the service 102(1) may choose to deploy the alterations or may choose to re-alter the service by, for example, rolling back the service 102(1) to its previous state or by attempting to otherwise fix the alterations.

In some instances, the meta-testing framework 108 of the central testing platform 104 may run each of these different testing frameworks against the services 102(1)-(N) themselves. In other instances, meanwhile, the distributed-services environment includes a stubbing service 116. The stubbing service 116 is configured to receive and record requests and replies of one or more of the services 102(1)-(N) during previous executions of testing frameworks. Thereafter, the stubbing may play back these stored requests and replies when the testing frameworks are re-executed. Therefore, the meta-testing framework 108 may execute some or all of the different testing frameworks against the stubbing service 116 rather than directly against the services 102(1)-(N) themselves. In addition, the testing service, such as the service 102(1), may introduce different scenarios by, for example, instructing the stubbing service 116 to operate or respond in a certain way. For instance, the service 102(1) may learn how it will perform in a brown-out situation by requesting that the stubbing service 116 introduce a certain amount of latency during test execution.

The service 102(1) and/or any other services 102(2)-(N) of the environment 100 may create any similar or different "what-if" scenarios. For instance, the distributed-services environment 100 may employ some or all of the stubbing service techniques described in U.S. patent application Ser. No. 12/851,176, filed on Aug. 5, 2010, which claims priority to U.S. Provisional Application Ser. No. 61/331,132, filed on May 4, 2010. Both of these applications are entitled "Stubbing Techniques in Distributed-Services Environments," and both are herein incorporated in their entirety by reference.

Figure 2:
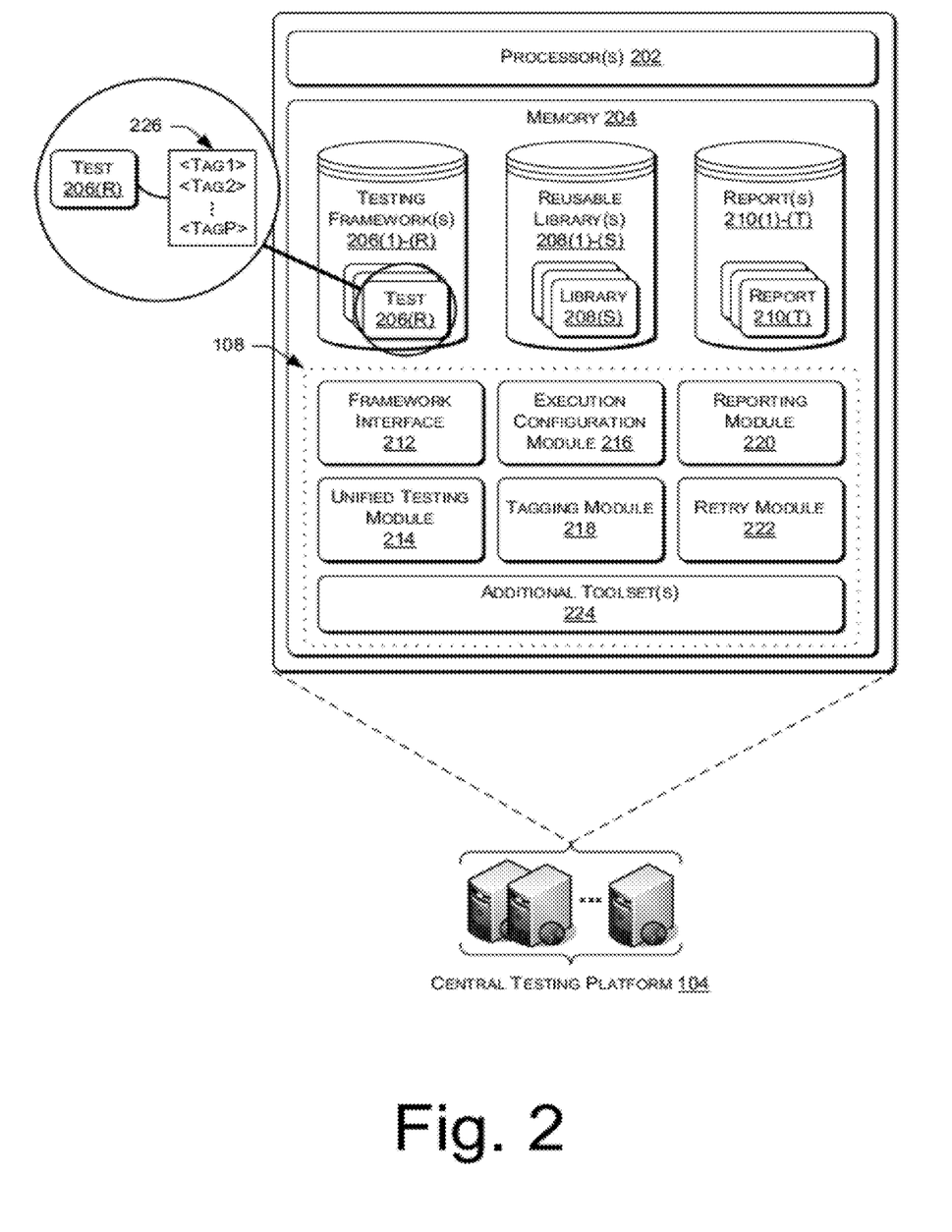
FIG. 2 illustrates example components of the central testing platform of FIG. 1.

FIG. 2 illustrates example components of the meta-testing framework 108 of the central testing platform 104 from FIG. 1 in further detail. As illustrated, in this example the central testing platform 104 comprises one or more processors 202 as well as memory 204. The memory 204 (as well as each instance of memory described herein) is an example of computer-readable media and may include volatile and/or non-volatile memory. Thus, the memory 204 may include, but is not limited to, RAM, ROM, EEPROM, flash memory, or other memory technology.

Here, the memory 204 stores one or more testing frameworks 206(1), ..., 206(R), one or more reusable libraries 208(1), ..., 208(S), one or more reports 210(1), ..., 210(T), as well as the unified and extensible meta-testing framework 108. The testing frameworks 206(1)-(R) may comprise, in whole or in part, testing frameworks of the services 102(1)-(N) that the services have plugged into the meta-testing framework 108. The reusable libraries 208(1)-(S), meanwhile, may allow the services 102(1)-(N) to recreate common scenarios (e.g., create an order with specific conditions). Finally, the reports 210(1)-(T) may comprise the results that the meta-testing framework 108 has generated in response to executing different ones of the testing frameworks 206(1)-(R) in accordance with received requests. As discussed below, the central testing platform 104 may provide these reports 210(1)-(T) to clients that employ the framework 108.

While FIG. 2 illustrates several example components of the unified and extensible testing framework 108 of FIG. 1, other implementations may employ more, fewer, and/or different components than those illustrated. In this example, the framework 108 includes a framework interface 212, a unified testing module 214, an execution configuration module 216, a tagging module 218, a reporting module 220, a retry module 222, and one or more additional toolsets 224.

The framework interface 212 may comprise a set of application programming interfaces (APIs), a graphical user interface (e.g., a command line tool), and/or any other type of interface with which an operator or other user of a service may access the framework 108. With use of the interface 212, an operator of one of the services 102(1)-(N) may plug different tests of the service into the framework 108, as well as request to execute different sets of testing frameworks.

After receiving such a request via the interface 212, the unified testing module 214 of the framework 108 may comply with the request and may execute the multiple different testing frameworks. This module 214 may execute each set of tests, despite the fact that the formats of the tests may differ from one another, having been written by different ones of the services 102(1)-(N).

In addition, the framework interface 212 may, in some instances, allow the operator to specify whether a particular set of tests is to be executed in a single thread or in multiple threads operating in parallel to one another. As such, the framework 108 includes the execution configuration module 216. This module 216 configures the execution of the tests in the single thread or in the multiple threads as specified by the received request. By enabling the operator to request to execute the tests via multiple threads, the framework shortens an amount of time needed to complete the testing.

The tagging module 218, meanwhile, may function to associate tags with tests of the testing frameworks in accordance with user requests, and/or may identify tags that users of the respective services 102(1)-(N) have previously associated with these tests prior to plugging the tests into the meta-testing framework. For instance, operators or other users of the services 102(1)-(N) and/or the central testing platform 104 may request, via the framework interface 212, to associate tags with tests plugged into the framework 108. In response, the tagging module 218 may associate these tags with the tests. Additionally or alternatively, operators or other users of the services 102(1)-(N) may associate the tags with the tests prior to plugging the tests into the framework 108. FIG. 2, for instance, illustrates that a particular test 206(R) has been associated with a set of tags 226.

In addition to allowing users to associate tags with the tests, the tagging module 218 may allow users to search for and/or execute tests with reference to the associated tags. For instance, users may request to execute those tests that have been associated with a particular set of one or more tags. In response, the tagging module 218 may identify and cause execution of the subset of tests that include the tags, while refraining from causing execution of those tests that have not been associated with such tags.

Next, the reporting module 220 allows users to select a reporting strategy to employ for execution of a given set of tests. For instance, the users may request that the reporting module 220 send certain types of communications or take certain types of actions when certain conditions are triggered during and/or after the execution of the tests. For instance, a user may request to receive a certain type of communication (e.g., an email, SMS text message, etc.) when a certain test passes or fails, after completion of a test, or in response to any other trigger.

In some instances, the reporting module 220 generates reports to provide to the user both during the execution of the tests, as well as after execution of the tests, if the reporting strategy of the user dictates. In some instances, the request itself specifies the reporting strategy, while in other instances the requesting service may be associated with a custom (and default) reporting strategy that the reporting module 220 employs for tests executed in response to requests from the particular service.

In addition to specifying a custom reporting strategy, the framework 108 includes the retry module 222 that allows users to specify custom retry strategies for tests that fail during the execution of the testing frameworks. For instance, the user may specify, down to a per-test basis or at any other level of granularity, a number of times that the unified testing module 214 should retry the failed tests (if at all). Further, the retry strategy may specify whether to rerun the failed test after the initial test execution process finishes, or before completion of the initial test execution process.

Finally, the additional toolsets 224 may provide operators or other users of the services 102(1)-(N) with other tools that further benefit the executing of testing frameworks from the central testing platform 104. For instance, an operator of the service 102(1) may specify that the framework 108 should auto-run a particular set of testing frameworks when the service 102(1) deploys any sort of modification or new service. The addition toolsets 224 may also allow the operator to directly compare two different testing executions, to view a comprehensive outline of a multiple executions of tests cases, or the like.

Figure 3:
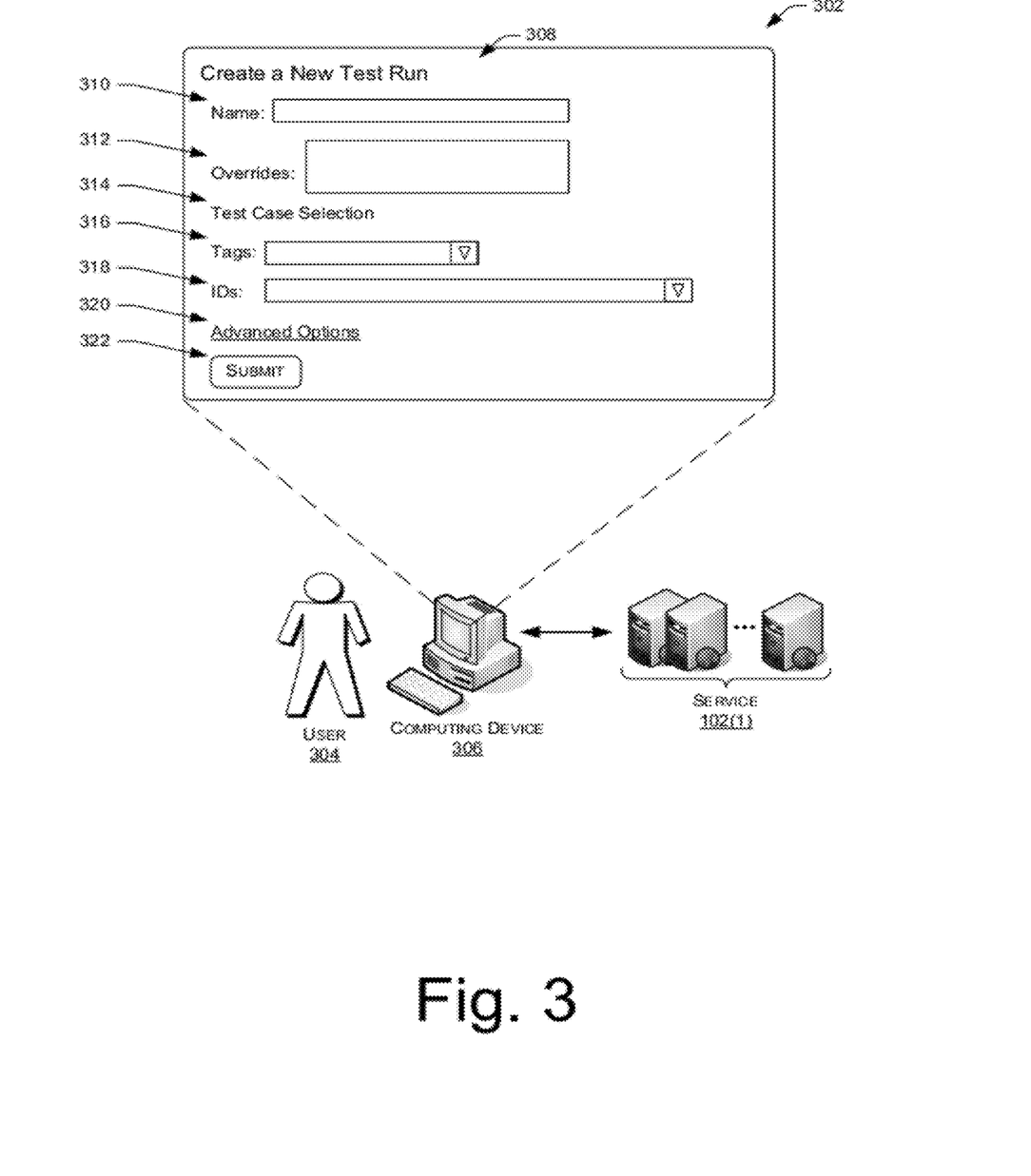
FIG. 3 illustrates an example user interface (UI) that an operator or other user of a service of FIG. 1 may receive from the central testing platform when attempting to test an alteration made to the operator's service.

FIG. 3 illustrates an example user interface (UI) 302 that an operator or other user 304 of an example service 102(1) may receive from the central testing platform 104 when attempting to test an alteration made to the user's service 102(1). In some instances, the framework interface 212 of FIG. 2 generates and serves the interface 302. As illustrated, the user 304 here uses a computing device 306 to access the central testing platform 104 and render the received UI 302. While this figure illustrates that the user 304 operates a desktop computing device, the user may use a laptop, mobile phone, or any other computing device in other implementations.

As illustrated, the UI 302 includes a heading 308 ("Create a New Custom Run"), an area 310 for the user 304 to enter a name of the run, an area 312 for the user to specify any overrides that she wishes to implement, and an area 314 that allows the user 304 to select the test cases to include in the run. These tests cases may include some or all of the testing frameworks that the services 102(1)-(N) have plugged into the meta-testing framework 108. In this example, the area 314 includes an area 316 and an area 318 that allows the user 304 to select the tests for the run via tags and an identifier of the tests, respectively. In this example, the user 304 may specify the tests by selecting tests that are associated with certain tags and/or by selecting tests that have certain IDs. While this example of the UI 302 illustrates that the user 304 may make these selections via respective drop-down menus, other implementations of the UI 302 may allow the user 304 to make these selections via free-form text entry, radio buttons, or in any other manner.

In addition, this example UI 302 includes a link 320 ("Advanced Option") that, when selected, may render another UI that allows the user 304 to make further selections regarding the custom run. For instance, these advanced options may allow the user 304 to specify a number of threads in which to execute the tests, specify a retry strategy, specify any sort of metadata on which to filter and, hence, select the tests to run, and the like. Finally, the UI 302 includes an icon 322 ("Submit") that, when selected, sends the request to create and execute the custom run to the central testing platform 104. In response to receiving the request, the unified and extensible meta-testing framework 108 may execute the custom execution run in accordance with the request.

Example Test-Execution Process

Figure 4:
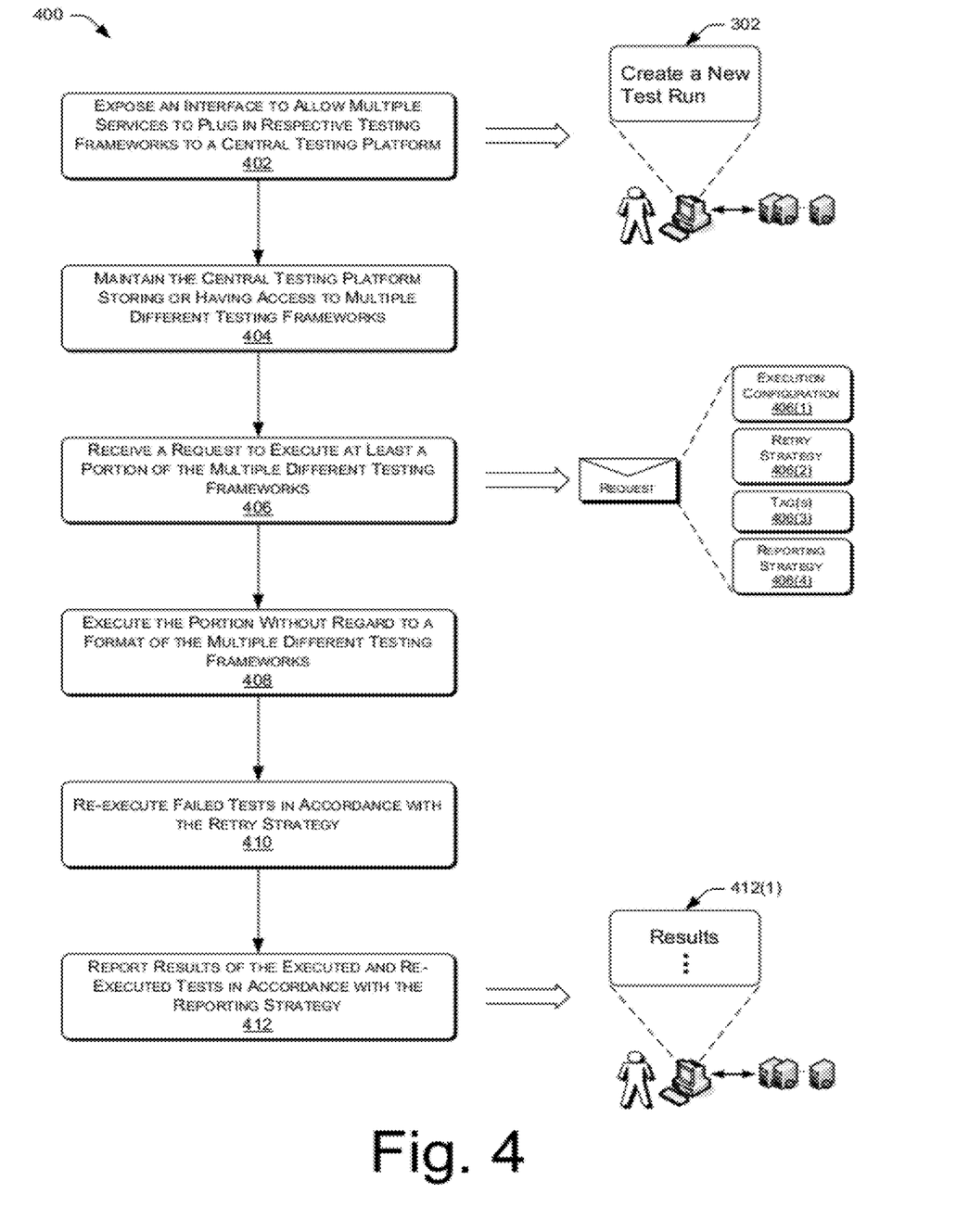
FIG. 4 is an example process that the central testing platform of FIG. 1 may implement to maintain the testing frameworks in the different formats from the services of FIG. 1 and to test these different testing frameworks in a unified manner.

FIG. 4 is an example process 400 that the central testing platform 104 may implement to maintain the testing frameworks in the different formats from the services of FIG. 1 and to test these different testing frameworks in a unified manner. This process (as well as other processes described throughout) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 400 (and the other processes) is described with reference to the environment 100 of FIG. 1, although other environments may implement this process.

At operation 402, the meta-testing framework 108 of the central testing platform 104 exposes an interface to allow multiple services to plug respective testing frameworks into the central testing platform. For instance, an operator of the service 102(1) may employ the interface 302 to plug some or all of the testing frameworks 110(1)-(M) into the central testing platform 104.

Operation 404, meanwhile, represents maintaining the central testing platform, which stores or otherwise has access to multiple different testing frameworks associated with multiple different services of the distributed-services environment 100. As discussed above, these testing frameworks may be of different formats, such as JUnit, TestNG, and the like.

At operation 406, the central testing platform 104 receives a request from a service to execute at least a portion of the multiple different testing frameworks stored on or accessible by the central testing platform 104. As illustrated, the request may specify an execution configuration 406(1), a retry strategy 406(2), one or more tags 406(3), and/or a reporting strategy 406(4). As discussed above, the execution configuration 406(1) may specify whether the user would like the meta-testing framework 108 of the central testing platform 104 to execute the run in a single thread or in multiple threads. The retry strategy 406(2), meanwhile, may specify a manner in which the user would like the central testing platform 104 to implement retries of failed tests. Finally, the tags 406(3) serve to identify those tests that the user would like to run, while the reporting strategy 406(4) specifies a manner in which the user would like the central testing platform 104 to report result of the run to the user.

At operation 408, the central testing platform executes the requested portion of the testing frameworks in accordance with the request and without regard to a format of the respective testing frameworks. For instance, despite the fact that the services 102(1)-(N) may have written their tests using different formats, the central testing platform 104 may implement the tests in a unified manner.

At operation 410, the central testing platform re-executes failed tests in accordance with the retry strategy 406(2). Finally, at operation 412, the central testing platform 104 may report the results of the executed and re-executed tests in accordance with the reporting strategy 406(4). For instance, the central testing platform 104 may provide the results to the user via a user interface 412(1) or in any other manner.

Example Self-Service Testing Processes

Figure 5:
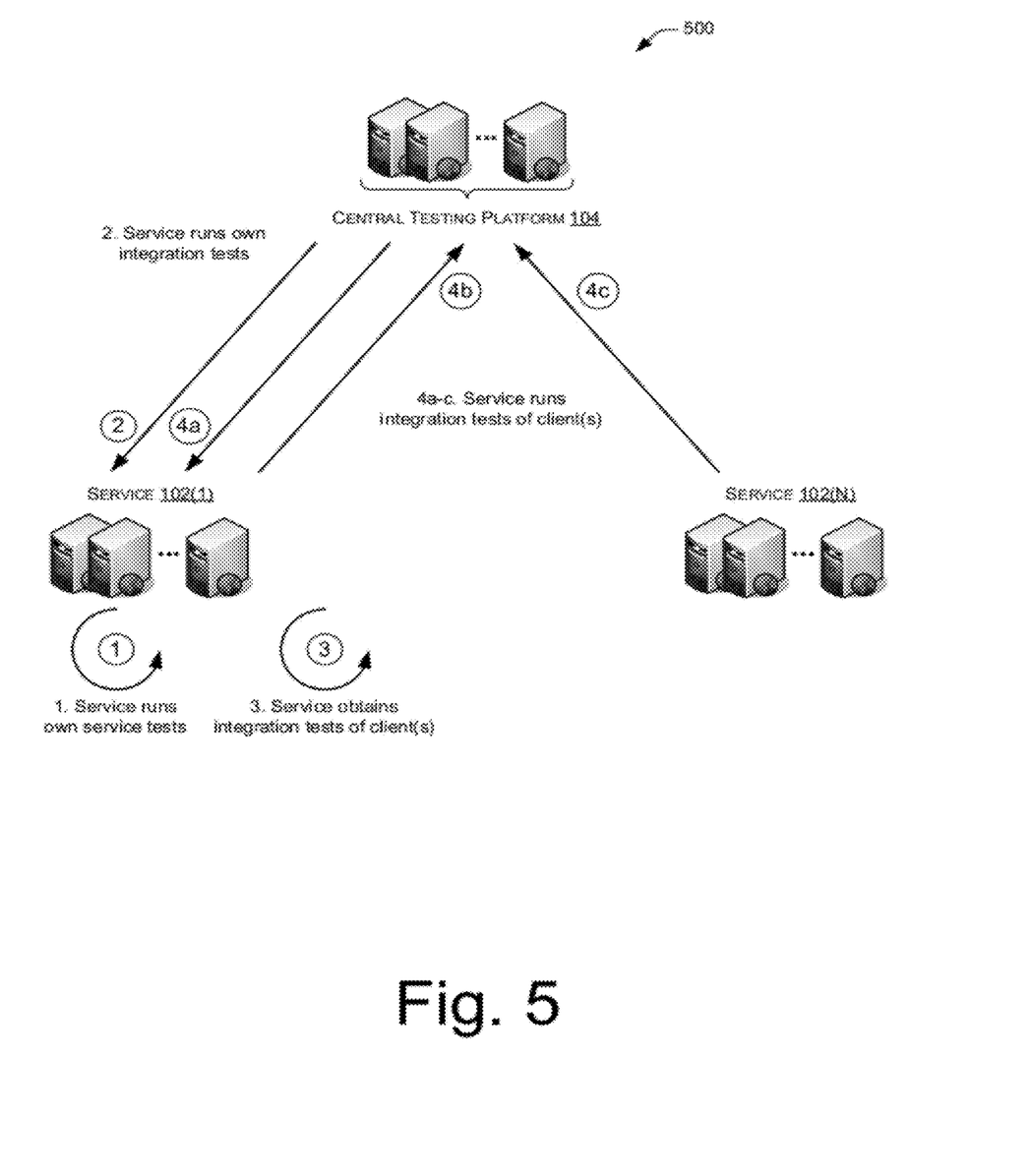
FIG. 5 is an example process that the environment of FIG. 1 may implement to allow a service in the environment to implement self-service testing. That is, this process allows the service to determine how a change to the service may affect the particular service itself, as well as how the change may affect services that depend upon the particular service.

FIG. 5 is an example process 500 that the environment 100 may implement to allow a service, such as the service 102(1) of FIG. 1, to implement self-service testing. That is, the process allows the service 102(1) to determine a how a change to the service 102(1) may affect the particular service 102(1) itself, as well as the how the change may affect services that depend upon the particular service 102(1).

At "1," the service 102(1) runs its own service tests after operators of the service 102(1) make an alteration (e.g., a change, update, or addition) to the service 102(1). These service tests determine an operability of the service 102(1) in isolation. That is, the service tests determine whether the service 102(1) will itself continue to operate at a sufficient level (i.e., at a predefined threshold level) after the changes to the service. In some instances, the service 102(1) determines the suitable or threshold operability level with reference to a quality of service (QoS) agreement that the service 102(1) is subject to, with reference to a level of operability of the service 102(1) prior to the alteration, or in any other manner.

In instances where the service 102(1) passes the service-level tests of "1" (and potentially in instances when it does not), the service 102(1) may run its own integration tests to determine an operability of the service 102(1) within the distributed-services environment 100 at "2." That is, these integration tests, which the service 102(1) owns, help the service 102(1) understand whether or not the service 102(1) still functions within the environment even after the alterations.

If so (and, in some instances, even if not), the service may proceed at "3" to obtain integration tests of those services within the environment 100 that depend from the service 102(1). That is, the service 102(1) may obtain integration tests for each client of the service 102(1). At "4a-c," meanwhile, the service 102(1) runs the integration tests for each of the clients of the service. The arrows labeled 4A, 4B, and 4C represent running integration tests associated with the service 102(N). By running integrations tests of dependent services, the service 102(1) learns whether the alteration to the service 102(1) "breaks" (i.e., adversely affects) any clients of the service 102(1). With this knowledge, the service 102(1) may refrain from deploying the service 102(1) with the alteration and/or may re-alter the service 102(1).

Figure 6:
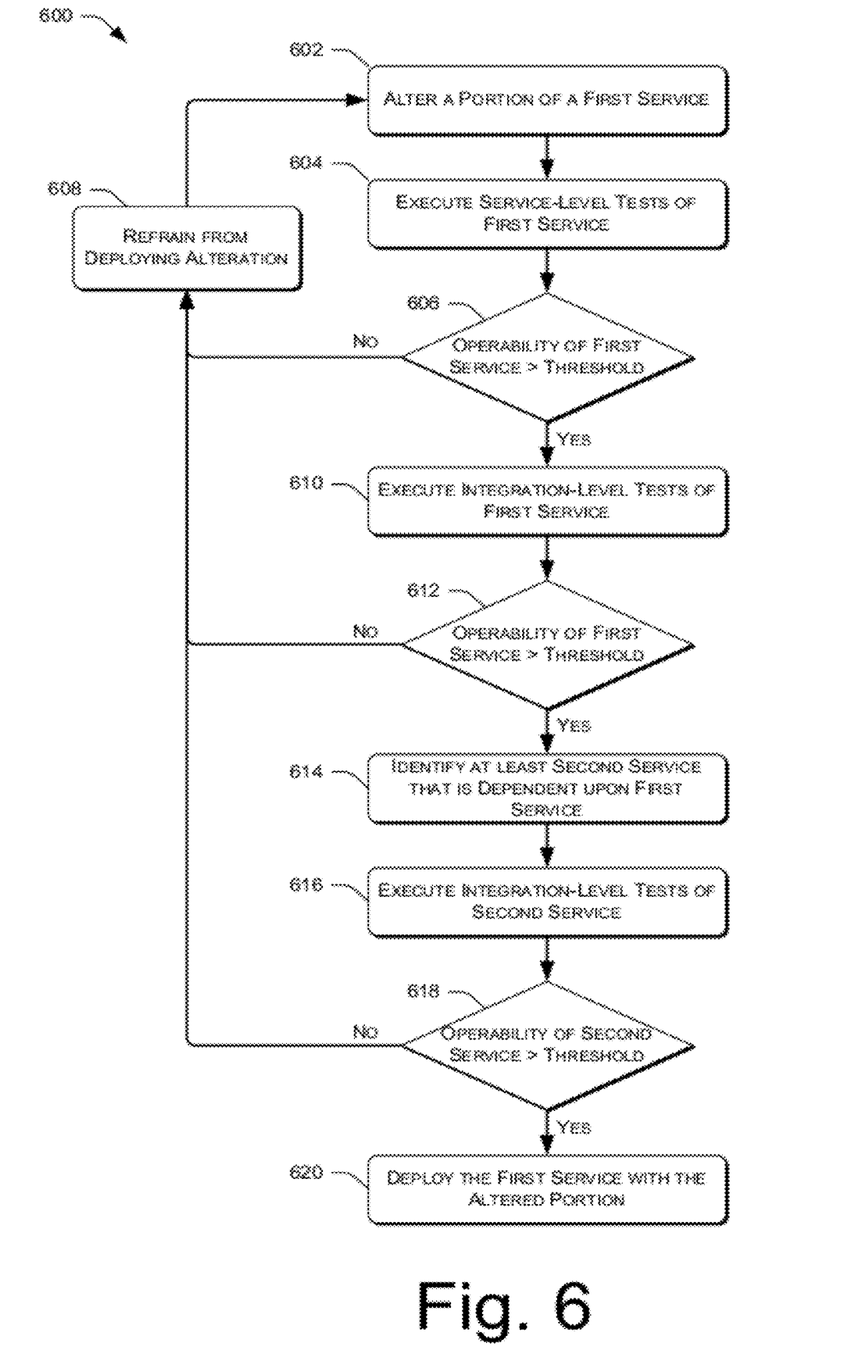
FIG. 6 is a flow diagram of an example process for implementing self-service testing.

FIG. 6 is a flow diagram of another example process 600 for implementing self-service testing. As with the process 500 of FIG. 5, some or all of the testing described in the process 600 may occur at or with use of the meta-testing framework 108 of the central testing platform 104. While some of these operations are described as being performed by a particular service (e.g, the first service), the central testing framework and/or other services of the environment may perform some or all of these operations in some instances.

At operation 602, a user or operator of a first service may alter a portion of the first service. At operation 604, the service 102(1) (e.g., at the request of the operator) may then execute service-level tests of the first service. At operation 606, the service queries as to whether an operability of the first service as determined by the testing of the operation 604 is greater than an operability threshold. This operability threshold (as well as each threshold described herein) may comprise an operability defined in a quality of service (QoS) agreement that the service 102(1) is subject to, an operability level of the service 102(1) prior to the alteration, a fully functional operational level, or any other level of operability.

If the operability of the first service is less than the threshold, then at operation 608 the service may refrain from deploying the alteration and may proceed to re-alter the portion of the first service. This re-altering may comprise rolling back the service to its state prior to the alteration or fixing the alteration in any other manner.

If, however, the operability of the first service is greater than the threshold, then at operation 610 the first service executes integration-level tests written by and/or owned by the first service. As discussed above, these tests determine how well the first service would integrate with other services of the distributed-services environment if deployed with the changes. At operation 612, the service queries as to whether an operability of the first service as determined by the testing of the operation 610 is greater than an operability threshold. This operability threshold may be the same or different than the threshold described above with reference to the operation 606.

If the operability of the first service is less than the threshold, then the process 600 again proceeds to the operation 608, at which point the service refrains from deploying the alteration and proceeds to re-alter the portion of the first service. If, however, the operability of the first service is greater than the threshold, then at operation 614 the first service identifies at least one service (a "second service") that is at least partially dependent upon the first service within the distributed-services environment. Next, at the operation 616, the service executes integration-level tests written by and/or owned by the second service (and/or the other identified dependent services). As discussed above, these tests determine whether the changes to the first service would adversely affect or break the second service of the distributed-services environment if deployed with the changes.

At operation 618, the first service or another entity queries as to whether an operability of the second service as determined by the testing of the operation 616 is greater than an operability threshold. This operability threshold may be the same or different than one or both of the thresholds described above with reference to the operations 606 and 612. If the operability of the second service is less than the threshold, then the process 600 again proceeds to the operation 608, at which point the service refrains from deploying the alteration to the first service and proceeds to re-alter the portion of the first service. If, however, the operability of the second service is greater than the threshold, then at operation 620 the first service may deploy the altered portion knowing that the alteration does not adversely affect itself nor any of the services of the environment that depend from the service.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A server system, comprising:
    one or more processors;
    memory, communicatively coupled to the one or more processors;
    a framework interface, stored in the memory and executable on the one or more processors, to receive testing frameworks having different formats from multiple different services of a distributed-service environment;
    a tagging module, stored in the memory and executable on the one or more processors, to identify tags that have been associated with tests of the testing frameworks;
    a unified testing module, stored in the memory and executable on the one or more processors, to receive a request to execute tests of the testing frameworks that are associated with a particular set of one or more tags and, in response, to execute those tests that are associated with the particular set of one or more tags; and
    a retry module, stored in the memory and executable on the one or more processors, to re-execute tests that fail during execution in accordance with a retry strategy associated with the received request, wherein the received request specifies the retry strategy or the retry strategy has been previously associated with a service of the distributed-services environment that provides the received request.

2. A server system as recited in claim 1, further comprising a reporting module, stored in the memory and executable on the one or more processors, to generate and provide one or more reports regarding the execution and the re-execution of the tests in accordance with a reporting strategy associated with the received request.

3. A server system as recited in claim 2, wherein the received request specifies the reporting strategy or the reporting strategy has been previously associated with a service of the distributed-services environment that provides the received request.

4. A central testing platform for a distributed-services environment, comprising:
    one or more processors;
    memory, communicatively coupled to the one or more processors; and
    a unified and extensible meta-testing framework, at least partially stored in the memory and executable on the one or more processors, to:
        provide an interface to multiple different services of the distributed-services environment that permits each respective service to plug a testing framework of the respective service into the unified and extensible meta-testing framework, at least some of the testing frameworks of the services being written in different formats;
        execute multiple testing frameworks written in the different formats at least partly in response to receiving a request to execute the multiple testing frameworks from a service of the distributed-services environment; and
        determine when a service of the distributed-services environment deploys a piece of software and, in response, to auto-run at least a portion of the multiple testing frameworks.

5. A central testing platform as recited in claim 4, wherein the unified and extensible meta-testing framework is further executable on the one or more processors to:
    facilitate selection via the interface of one or more tags that have been associated with tests of the testing frameworks of the multiple different services;
    and wherein the executing of the multiple different testing frameworks comprises executing those tests of the multiple different testing frameworks that are associated with the selected one or more tags.

6. One or more computer-readable media storing computer-executable instructions that, when executed, cause one or more processors to perform acts comprising:

maintaining a central testing platform for a distributed environment that includes multiple different entities each having a testing framework for testing the respective entity within the distributed environment, the central testing platform storing or having access to the testing frameworks of the multiple different entities;

receiving, from one of the multiple different entities and at the central testing platform, a request to execute at least a portion of the testing frameworks of the multiple different entities, each of the multiple different entities providing a service that is dependent, at least in part, on another entity of the multiple different entities; and at least partly in response to the receiving of the request, executing the at least a portion of the testing frameworks without regard to a format in which each respective testing framework has been written.

7. One or more computer-readable media as recited in claim 6, wherein at least some of the multiple testing frameworks are written in different formats.

8. One or more computer-readable media as recited in claim 6, wherein:

the received request instructs the central testing platform to execute tests of the multiple testing frameworks that are associated with a particular tag; and the executing of the at least a portion of the multiple testing frameworks comprises executing tests of the multiple testing frameworks that are associated with the particular tag specified in the received request.

9. One or more computer-readable media as recited in claim 6, further storing computer-executable instructions that, when executed, cause the one or more processors to perform an act comprising reporting, after and/or during the executing, results of the at least a portion of the multiple testing frameworks to the entity that provided the received request.

10. One or more computer-readable media as recited in claim 9, wherein the received request specifies a custom set of reports to run during and/or after the executing, and wherein the results are reported in accordance with the specified custom set of reports.

11. A server system, comprising:

one or more processors;

memory, communicatively coupled to the one or more processors;

a framework interface, stored in the memory and executable on the one or more processors, to receive testing frameworks having different formats from multiple different services of a distributed-service environment;

a tagging module, stored in the memory and executable on the one or more processors, to identify tags that have been associated with tests of the testing frameworks;

a unified testing module, stored in the memory and executable on the one or more processors, to receive a request to execute tests of the testing frameworks that are associated with a particular set of one or more tags and, in response, to execute those tests that are associated with the particular set of one or more tags, wherein the received request specifies whether the tests are to be executed in a single thread or in multiple threads as specified by the received request;

a retry module, stored in the memory and executable on the one or more processors, to re-execute tests that fail during execution in accordance with a retry strategy associated with the received request; and an execution configuration module, stored in the memory and executable on the one or more processors, to configure execution tests in the single thread or in the multiple threads as specified by the received request.

12. A central testing platform for a distributed-services environment, comprising:

one or more processors;

memory, communicatively coupled to the one or more processors; and a unified and extensible meta-testing framework, at least partially stored in the memory and executable on the one or more processors, to:

provide an interface to multiple different services of the distributed-services environment that permits each respective service to plug a testing framework of the respective service into the unified and extensible meta-testing framework, at least some of the testing frameworks of the services being written in different formats;

facilitate selection via the interface of whether to execute multiple testing frameworks in a single thread or in multiple threads operating in parallel with one another; and execute the multiple testing frameworks written in the different formats in the single thread or in the multiple threads in accordance with the selection and at least partly in response to receiving a request to execute the multiple testing frameworks from a service of the distributed-services environment.

13. A central testing platform for a distributed-services environment, comprising:

one or more processors;

memory, communicatively coupled to the one or more processors; and a unified and extensible meta-testing framework, at least partially stored in the memory and executable on the one or more processors, to:

provide an interface to multiple different services of the distributed-services environment that permits each respective service to plug a testing framework of the respective service into the unified and extensible meta-testing framework, at least some of the testing frameworks of the services being written in different formats;

execute multiple testing frameworks written in the different formats at least partly in response to receiving a request to execute the multiple testing frameworks from a service of the distributed-services environment; and provide a plug-in mechanism that permits the service requesting to execute the multiple testing frameworks to specify a custom set of reports to generate during and/or after execution of the multiple testing frameworks.

14. A central testing platform for a distributed-services environment, comprising:

one or more processors;

memory, communicatively coupled to the one or more processors; and a unified and extensible meta-testing framework, at least partially stored in the memory and executable on the one or more processors, to:

provide an interface to multiple different services of the distributed-services environment that permits each respective service to plug a testing framework of the respective service into the unified and extensible meta-testing framework, at least some of the testing frameworks of the services being written in different formats;

execute multiple testing frameworks written in the different formats at least partly in response to receiving a request to execute the multiple testing frameworks from a service of the distributed-services environment; and provide a mechanism that permits the service requesting to execute the multiple testing frameworks to specify a custom retry strategy to employ for tests of the multiple testing frameworks that fail.

15. One or more computer-readable media storing computer-executable instructions that, when executed, cause one or more processors to perform acts comprising:

maintaining a central testing platform for a distributed environment that includes multiple different entities each having a testing framework for testing the respective entity within the distributed environment, the central testing platform storing or having access to the testing frameworks of the multiple different entities;

receiving, from one of the multiple different entities and at the central testing platform, a request to execute at least a portion of the testing frameworks of the multiple different entities, wherein the multiple different entities comprise different services that are commonly owned or that operate together but have different respective owners; and at least partly in response to the receiving of the request, executing the at least a portion of the testing frameworks without regard to a format in which each respective testing framework has been written.

16. One or more computer-readable media storing computer-executable instructions that, when executed, cause one or more processors to perform acts comprising:

maintaining a central testing platform for a distributed environment that includes multiple different entities each having a testing framework for testing the respective entity within the distributed environment, the central testing platform storing or having access to the testing frameworks of the multiple different entities;

receiving, from one of the multiple different entities and at the central testing platform, a request to execute at least a portion of the testing frameworks of the multiple different entities, the received request specifying whether to execute the at least a portion of the multiple testing frameworks in a single thread or in multiple threads; and at least partly in response to the receiving of the request, executing the at least a portion of the testing frameworks in the single thread or in the multiple threads in accordance with the received request and without regard to a format in which each respective testing framework has been written.

17. One or more computer-readable media storing computer-executable instructions that, when executed, cause one or more processors to perform acts comprising:

maintaining a central testing platform for a distributed environment that includes multiple different entities each having a testing framework for testing the respective entity within the distributed environment, the central testing platform storing or having access to the testing frameworks of the multiple different entities;

receiving, from one of the multiple different entities and at the central testing platform, a request to execute at least a portion of the testing frameworks of the multiple different entities;

at least partly in response to the receiving of the request, executing the at least a portion of the testing frameworks without regard to a format in which each respective testing framework has been written; and exposing an interface that allows each of the multiple different entities to plug a respective testing framework into the central testing platform.

18. One or more computer-readable media storing computer-executable instructions that, when executed, cause one or more processors to perform acts comprising:

maintaining a central testing platform for a distributed environment that includes multiple different entities each having a testing framework for testing the respective entity within the distributed environment, the central testing platform storing or having access to the testing frameworks of the multiple different entities;

receiving, from one of the multiple different entities and at the central testing platform, a request to execute at least a portion of the testing frameworks of the multiple different entities, the received request specifying a custom retry strategy to employ for tests of the at least a portion of the multiple testing frameworks that fail during the executing;

at least partly in response to the receiving of the request, executing the at least a portion of the testing frameworks without regard to a format in which each respective testing framework has been written; and re-executing the failed tests in accordance with the custom retry strategy.

* * * * *